(12) United States Patent
Jeon et al.

(10) Patent No.: US 11,794,461 B2
(45) Date of Patent: Oct. 24, 2023

(54) LAMINATION SYSTEM

(71) Applicant: STI CO., LTD., Anseong-si (KR)

(72) Inventors: Eun Su Jeon, Anseong-si (KR); Kyu Yong Han, Anseong-si (KR); Sang Pil Park, Anseong-si (KR); Jae Hwan Kim, Anseong-si (KR)

(73) Assignee: STI CO., LTD., Anseong-si (KR)

( * ) Notice: Subject to any disclaimer, the term of this patent is extended or adjusted under 35 U.S.C. 154(b) by 0 days.

(21) Appl. No.: 17/675,520

(22) Filed: Feb. 18, 2022

(65) Prior Publication Data

US 2022/0339922 A1 Oct. 27, 2022

(30) Foreign Application Priority Data

Apr. 26, 2021 (KR) ......................... 10-2021-0053514

(51) Int. Cl.
*B32B 41/00* (2006.01)
*B32B 37/02* (2006.01)
*B32B 38/18* (2006.01)
*B32B 39/00* (2006.01)

(52) U.S. Cl.
CPC .............. *B32B 37/02* (2013.01); *B32B 38/18* (2013.01); *B32B 39/00* (2013.01); *B32B 41/00* (2013.01); *B32B 2309/70* (2013.01)

(58) Field of Classification Search
CPC ......... B32B 37/02; B32B 38/18; B32B 39/00; B32B 41/00; B32B 2309/70

USPC ..................... 156/60, 64, 350, 351, 378, 379
See application file for complete search history.

(56) References Cited

U.S. PATENT DOCUMENTS

2013/0008581 A1* 1/2013 Yuki ................. H01L 21/68785
156/379

FOREIGN PATENT DOCUMENTS

| KR | 10-2012-0124809 | 11/2012 |
| KR | 10-1588810 | 2/2016 |
| KR | 10-1848039 | 4/2018 |

* cited by examiner

Primary Examiner — Michael N Orlando
Assistant Examiner — Joshel Rivera
(74) Attorney, Agent, or Firm — KILE PARK REED & HOUTTEMAN PLLC

(57) ABSTRACT

Disclosed is a lamination system. A lamination system, which bonds a panel and a bonding target panel to from a panel assembly, according to one embodiment of the present invention may include a transfer which moves along a transfer shuttle and supports any one among the panel, the bonding target panel, and the panel assembly, a bonding chamber which is provided parallel to the transfer shuttle and bonds the panel and the bonding target panel, and a first robot which transfers any one among the panel, the bonding target panel, and the panel assembly between the transfer and the bonding chamber.

10 Claims, 7 Drawing Sheets

A-A'

LAMINATION SYSTEM

CROSS-REFERENCE TO RELATED APPLICATION

This application claims priority to and the benefit of Korean Patent Application No. 10-2021-0053514, filed on Apr. 26, 2021, the disclosure of which is incorporated herein by reference in its entirety.

BACKGROUND

1. Field of the Invention

The present invention relates to a lamination system, and more specifically, to a lamination system which sequentially performs a bonding process of a plurality of panel assemblies.

2. Discussion of Related Art

As display technologies are developed, various types of display apparatuses are being developed. In order to implement a large area screen while improving portability, a demand for a foldable display apparatus in which a partial region of the display apparatus is foldable is increasing.

In a display apparatus, different functional panels are formed, and an adhesive layer is interposed therebetween to bond the panels. Types of such adhesive layers include a film type adhesive layer (optical clear adhesive (OCA)) and a liquid curing type adhesive layer (optical clear resin (OCR)) in which a liquid type adhesive is applied and cured.

Many processes are performed in a manufacturing process of a display apparatus, and the many processes are sequentially performed in a serial order. As a method of increasing a product yield using process apparatuses of the display apparatus, process lines of performing the same function are formed as a dual line, a series of sequential process lines including a pre-process apparatus and a main process apparatus is integrally provided, or the like.

Display apparatuses need to be implemented thinner, lighter, and more functional. In addition, as a size of the display apparatus is enlarged, since a working space in a large site is required due to a manufacturing process, and a size of a related apparatus is also enlarged to correspond thereto, a method of efficiency is required from a viewpoint of spatial limitations.

RELATED ART

Patent Document (Patent Document 0001) Korean Registration Publication No. 10-1848039 (Date of publication: Apr. 5, 2018)

SUMMARY OF THE INVENTION

The present invention is directed to providing a lamination system allowing a tact time of a bonding process to be reduced to improve panel throughput performance.

The present invention is also directed to providing a lamination system in which a degree of spatial integration is improved.

The present invention provides a lamination system in order to solve the technical problem.

According to an aspect of the present invention, there is provided a lamination system which bonds a panel and a bonding target panel to form a panel assembly, the lamination system including a transfer which moves along a transfer shuttle and supports any one among the panel, the bonding target panel, and the panel assembly, a bonding chamber which is provided parallel to the transfer shuttle and bonds the panel and the bonding target panel, and a first robot which transfers any one among the panel, the bonding target panel, and the panel assembly between the transfer and the bonding chamber.

The bonding chamber may be disposed as a plurality of bonding chambers with the transfer shuttle interposed therebetween.

The first robot may have a movement range in which the first robot is connected to at least two of the bonding chambers.

The lamination system may include a second robot which transfers the bonding target panel to the transfer, and a third robot which transfers the panel assembly from the transfer, wherein the transfer shuttle may be provided parallel to the bonding chamber in a first direction, and an end portion of the transfer shuttle may be positioned within a movement range of the second robot.

The lamination system may further include a vision which moves along a vision shuttle, accesses at least two of the bonding chambers, and checks a position of the panel or the bonding target panel loaded in the bonding chamber.

The vision shuttle may be provided parallel or to intersect with the transfer shuttle.

The lamination system may further include a controller which controls the transfer, the bonding chamber, and the first robot to be driven, wherein the controller may include a robot arm counter which adjusts the panel assembly to be received from the first robot in each robot arm cycle and a loading counter which adjusts the bonding target panel to be provided to the transfer in each loading cycle, and the loading cycle may be correlated with the robot arm cycle by a factor of n (n is an integer and n>0).

The controller may further include a bonding counter which adjusts the bonding chamber to bond the panel assembly in each bonding cycle, and the robot arm cycle may be correlated with the bonding cycle by a factor of n (n is an integer and n>0).

According to another aspect of the present invention, there is provided a lamination system including a laminating portion in which different bonding chambers are provided apart from each other, a loading portion into which a panel is loaded, an unloading portion from which a panel assembly, in which a bonding target panel is bonded to the panel, is unloaded, a transfer which moves along the loading portion, the unloading portion, and the laminating portion and supports at least any one of the panel, the bonding target panel, and the panel assembly, a first robot which moves a position of at least any one among the panel, the bonding target panel, and the panel assembly between the bonding chamber and the transfer, a second robot which moves a position of the bonding target panel between the loading portion and the transfer, and a third robot which moves a position of the panel assembly between the unloading portion and the transfer.

The laminating portion may be provided parallel to the loading portion and the unloading portion in a first direction, and the loading portion may be provided parallel to the unloading portion in a second direction perpendicular to the first direction.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, exemplary embodiments of the present invention will be described in detail with reference to the accompanying drawings. However, the technical spirit of the present invention is not limited to the embodiments which will be described in this specification and may be realized with different forms. Further, the embodiments introduced in this specification are provided so that the disclosed content is thorough and complete and the spirit of the present invention is sufficiently conveyed to those skilled in the art.

In the present specification, when a certain component is described as being present on another component, it means that the component may be directly disposed on another component, or a third component may be interposed therebetween. In addition, in the accompanying drawings, shapes and sizes are exaggerated to effectively describe the technical content.

In addition, although the terms "first," "second," "third," and the like are used herein to describe various elements in the various embodiments of the present specification, these elements should not be limited by these terms. These terms are only used to distinguish a certain element from another element. Accordingly, an element described as a first element in any one embodiment may be described as a second element in another embodiment. The embodiments described and illustrated in this specification include complementary embodiments thereof. In addition, the term "and/or" is used to include at least any one of elements listed therebefore and thereafter.

The singular forms are intended to include the plural forms, unless the context clearly indicates otherwise. In addition, the terms "comprise," "include," or the like specify the presence of features, numbers, steps, operations, elements, or combinations thereof which are described in the specification, but do not preclude the presence or addition of one or more other features, numbers, steps, operations, elements, or combinations thereof. In addition, in this specification, the term "connect" is used to include both indirect and direct connection of a plurality of elements.

In addition, in the following description, when it is determined that detailed descriptions of related well-known functions or configurations unnecessarily obscure the gist of the present invention, the detailed descriptions thereof will be omitted.

For the sake of convenience in the description, a first direction corresponds to an X-axis in an orthogonal coordinate system, a second direction corresponds to a Y-axis in the orthogonal coordinate system, and a third direction corresponds to a Z-axis in the orthogonal coordinate system. In this case, the first direction is perpendicular to the second direction and the third direction.

Figure 1:
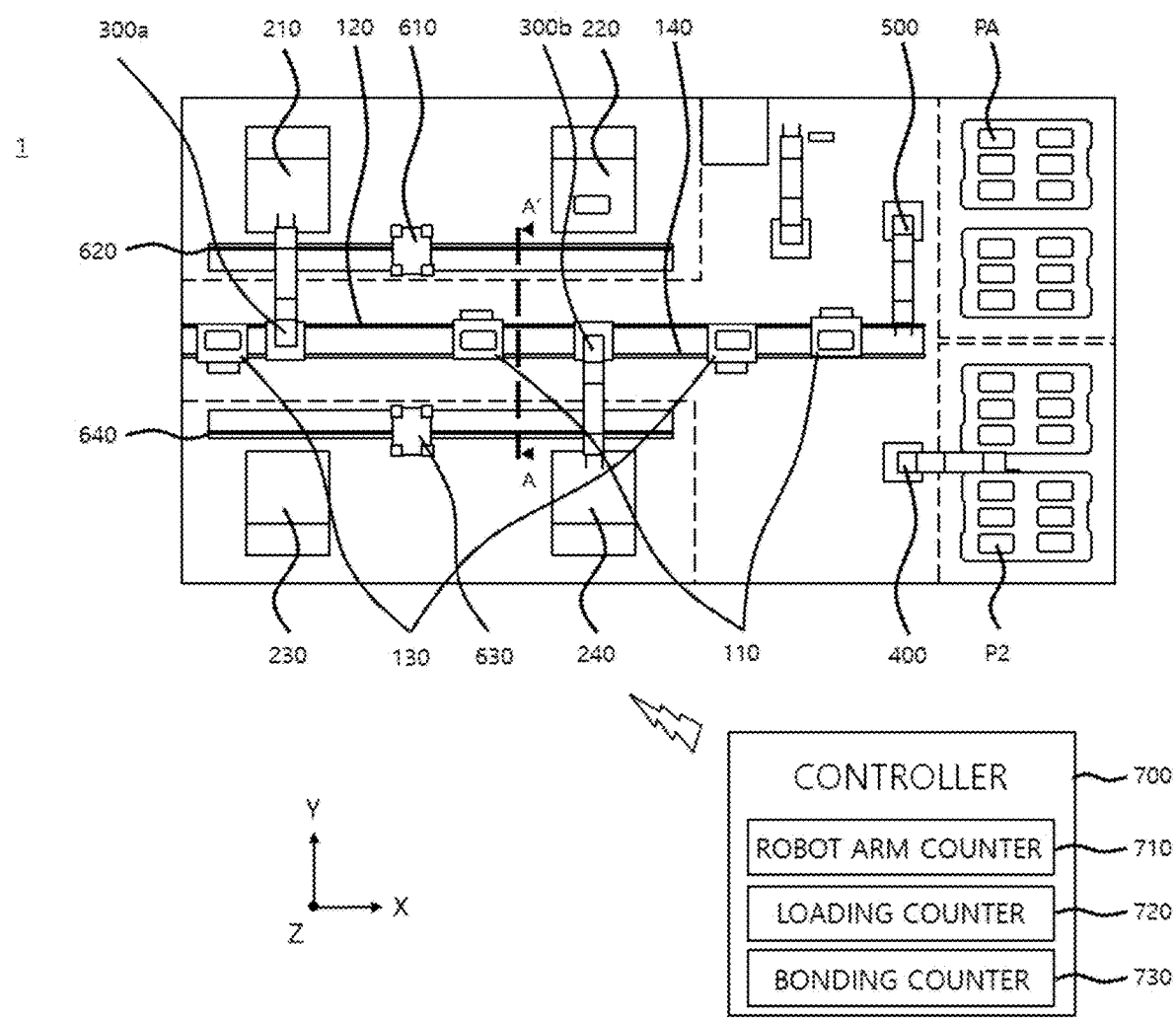
FIG. 1 is a schematic view illustrating a lamination system according to one embodiment of the present invention.
Figure 2:
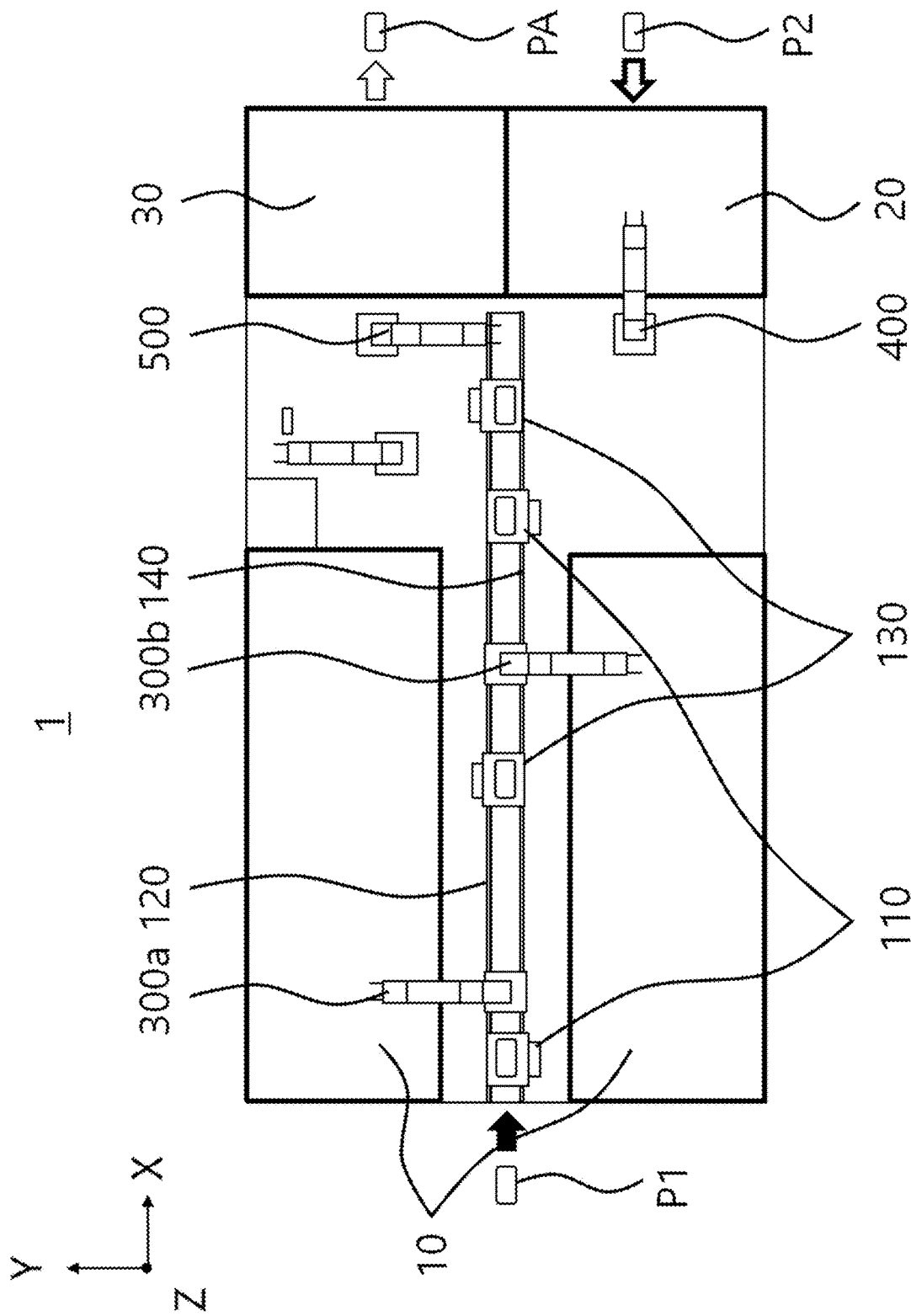
FIG. 2 is a view illustrating a lamination system according to one embodiment of the present invention.
Figure 3:
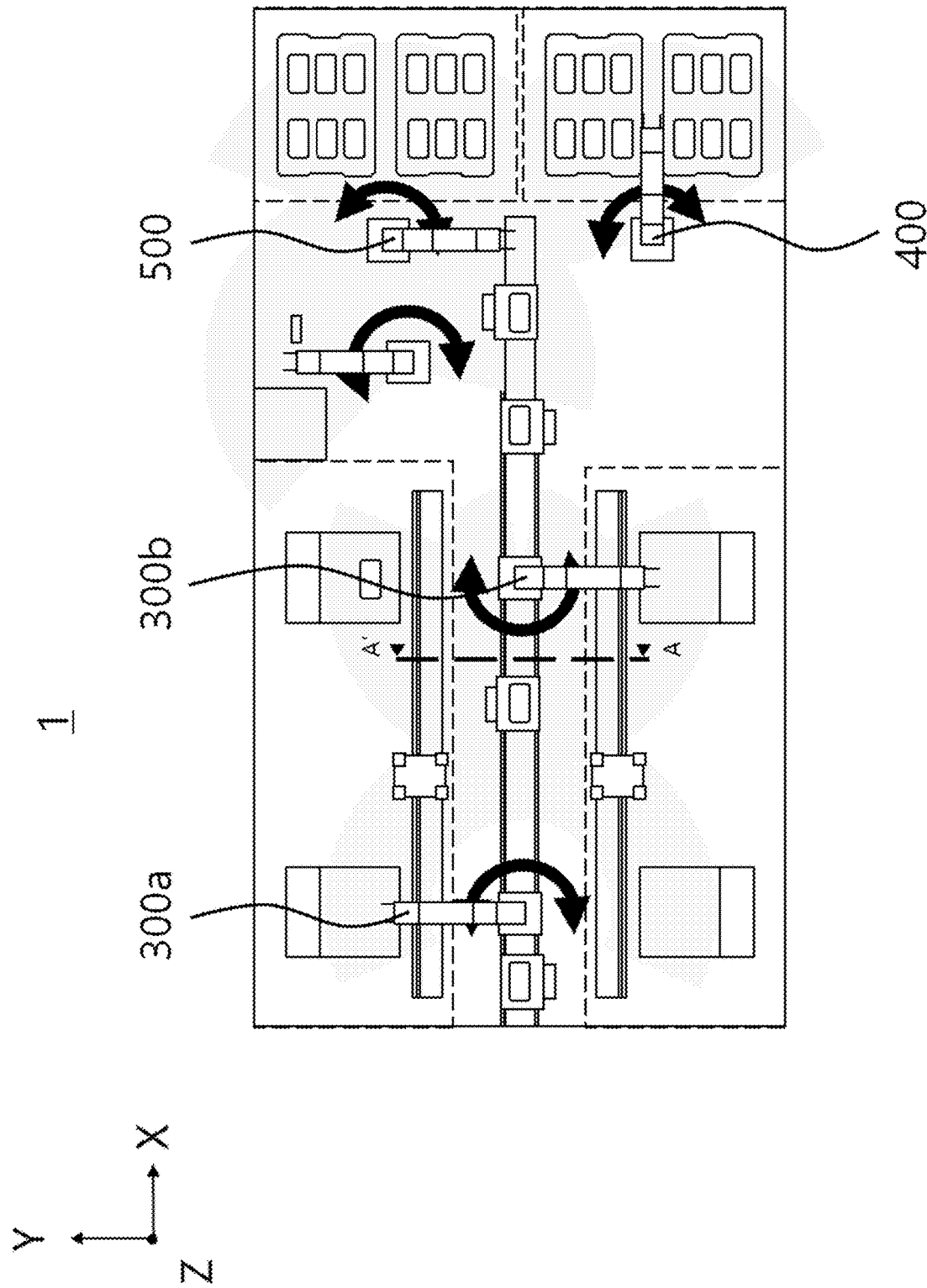
FIG. 3 is a schematic view illustrating movement ranges of first to third robots in FIG. 1.
Figure 4:
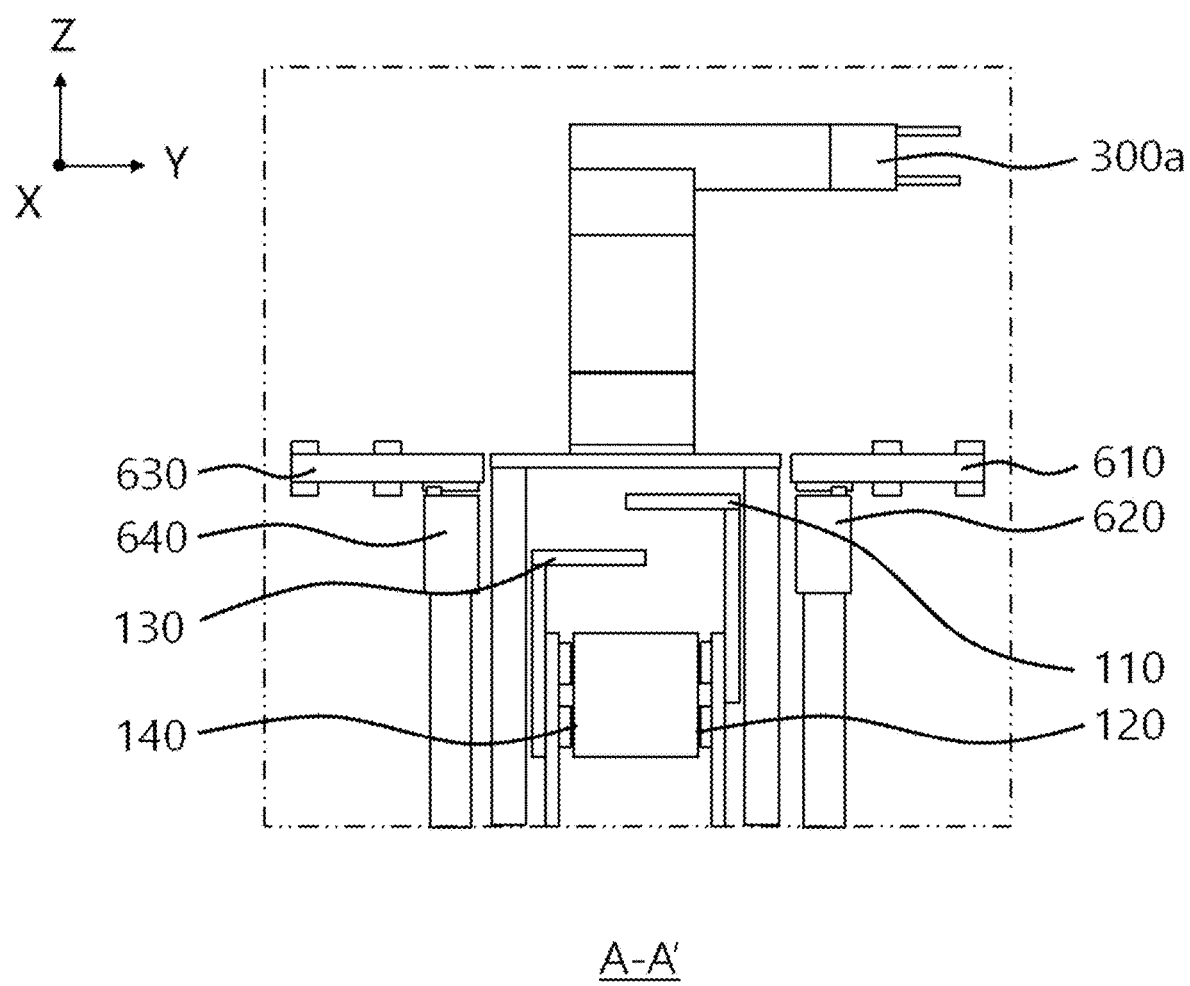
FIG. 4 is a side cross-sectional view taken along line A-A' in FIG. 3.
Figure 5:
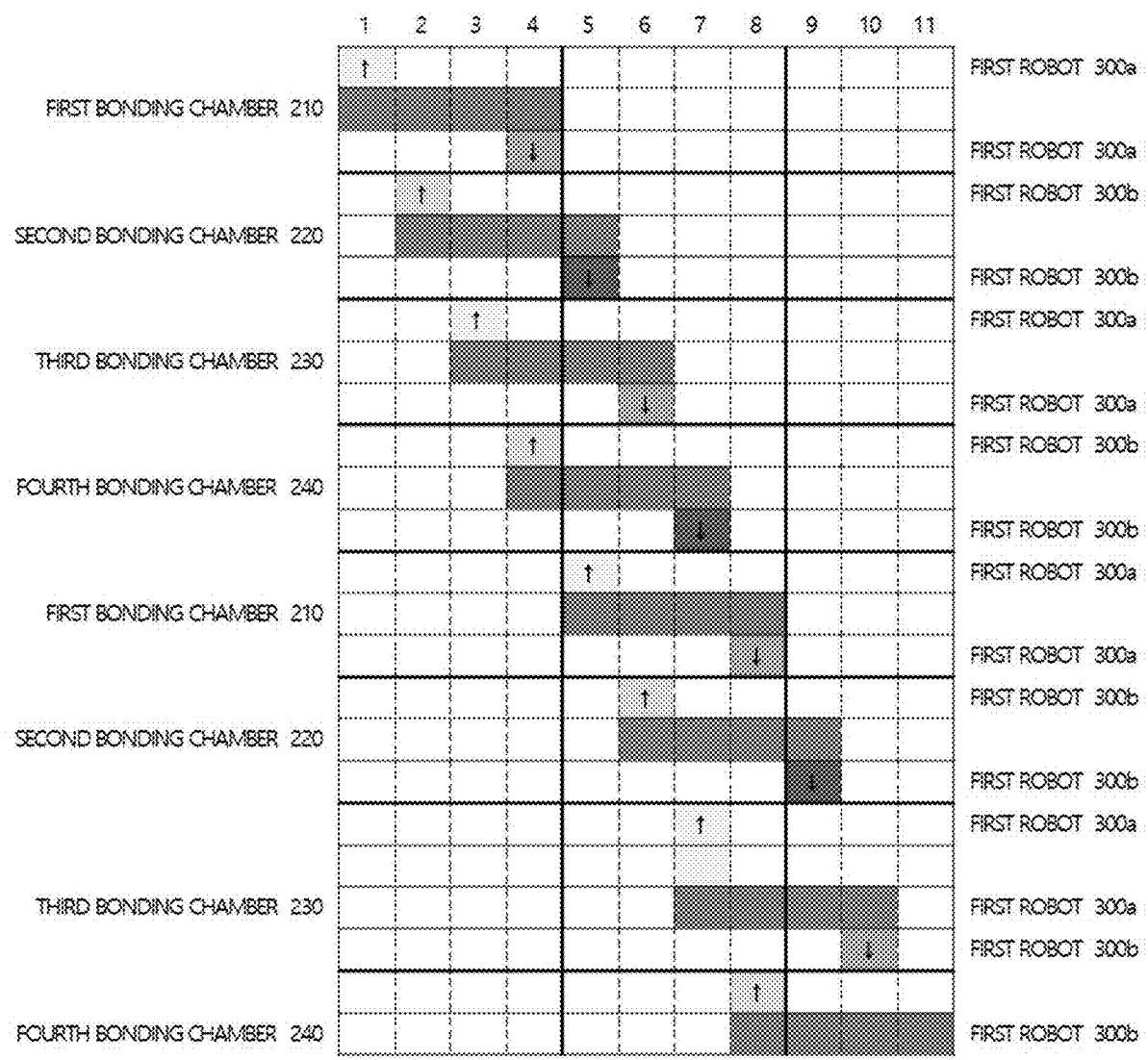
FIG. 5 is a view showing a table which shows a sequential lamination operation flow according to a signal cycle of a robot arm counter and a bonding counter according to one embodiment of the present invention.
Figure 6:
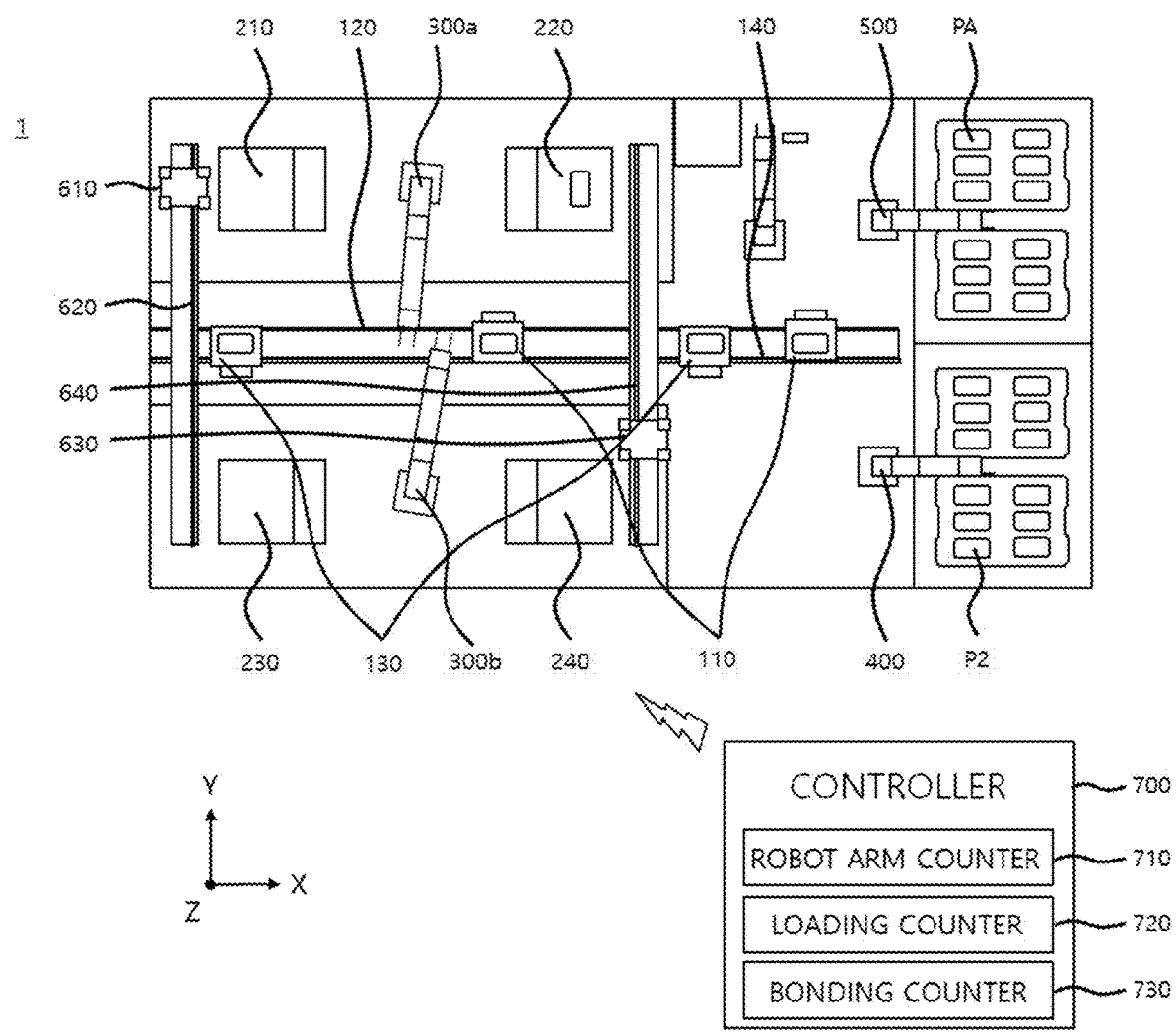
FIG. 6 is a schematic view illustrating a lamination system according to another embodiment of the present invention.
Figure 7:
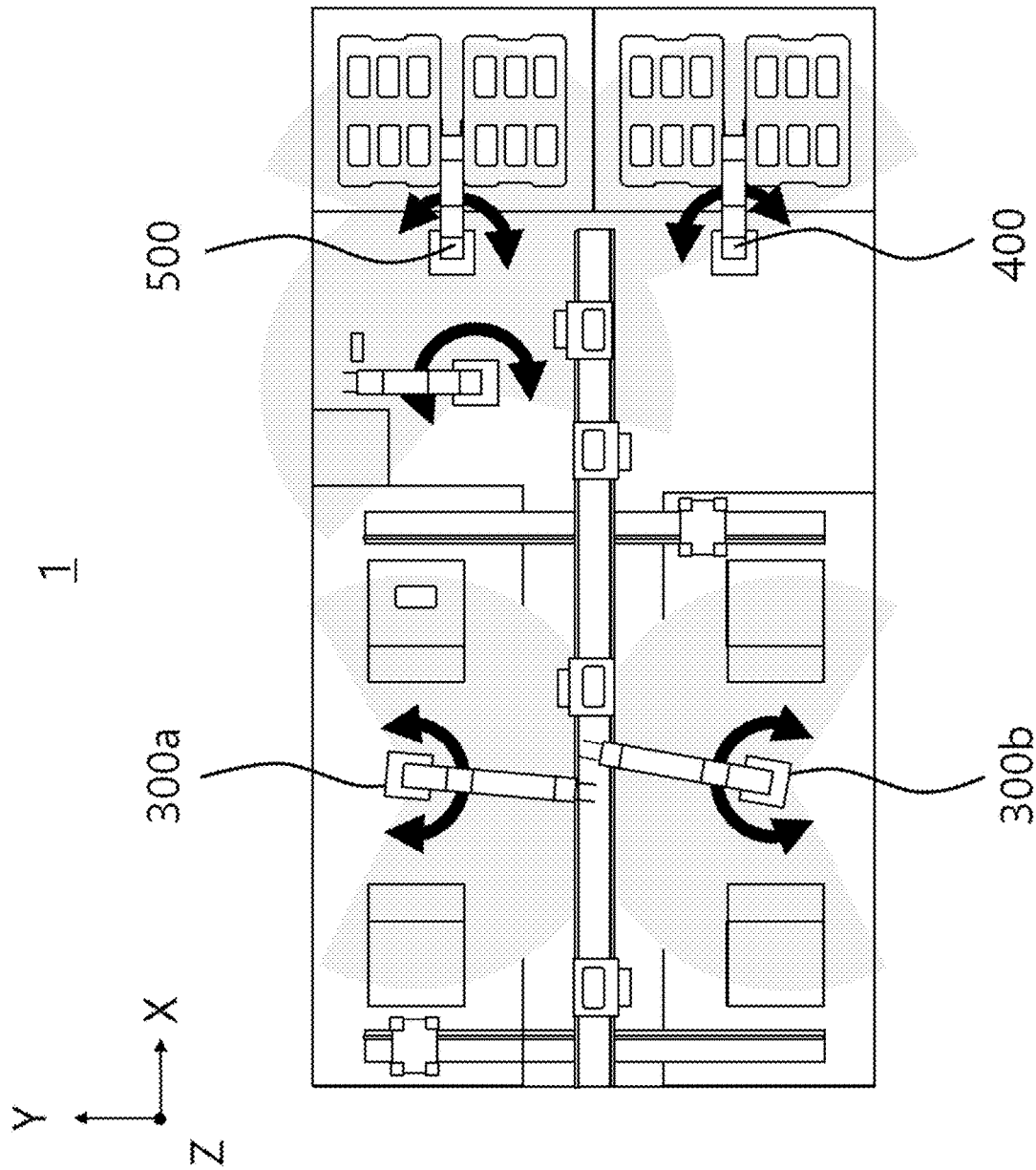
FIG. 7 is a schematic view illustrating movement ranges of first robots to a third robot in FIG. 6.

FIG. 1 is a schematic view illustrating a lamination system 1 according to one embodiment of the present invention, FIG. 2 is a view illustrating the lamination system 1 according to one embodiment of the present invention, FIG. 3 is a schematic view illustrating movement ranges of first robots 300*a* and 300*b* to a third robot 500 in FIG. 1, FIG. 4 is a side cross-sectional view taken along line A-A' in FIG. 3, FIG. 5 is a view showing a table which shows a sequential lamination operation flow according to a signal cycle of a robot arm counter 710 and a bonding counter 730 according to one embodiment of the present invention, FIG. 6 is a schematic view illustrating a lamination system 1 according to another embodiment of the present invention, and FIG. 7 is a schematic view illustrating movement ranges of first robots 300*a* and 300*b* to a third robot 500 in FIG. 6.

Hereinafter, a configuration and operational relationships of the present invention will be described with reference to FIGS. 1 to 7.

Referring to FIGS. 1 to 7, the lamination system 1 according to one embodiment of the present invention may perform a bonding process of bonding a panel P1 and a bonding target panel P2 of a display apparatus formed of a panel and a plurality of layers. According to one embodiment, the lamination system 1 may bond the panel P1 and the bonding target panel P2 by stacking or applying an adhesive on the panel P1 so that the adhesive is interposed between the panel P1 and the bonding target panel P2.

Each of the panel P1 and the bonding target panel P2 according to one embodiment of the present invention may be any one of a display panel, a touch panel, and a window panel such as a liquid crystal display (LCD) panel, an organic light-emitting diode (OLED) panel, or a plasma display panel (PDP), or a panel having a plurality of layers in which a display panel, a touch panel, and a window panel are stacked and coupled. In addition, each of the panel P1 and the bonding target panel P2 may include not only a rigid panel but also a flexible panel formed of a flexible material capable of bending, folding, or rolling.

A panel assembly PA may be a panel in a state in which the panel P1 and the bonding target panel P2 are completely bonded in bonding chambers 210 to 240 which will be described below.

Referring back to FIGS. 1 to 7, the lamination system 1 according to one embodiment of the present invention may bond the panel P1 and the bonding target panel P2 to form the panel assembly PA. The lamination system 1 may include transfers 110 and 130, bonding chambers 210 to 240, and first robots 300*a* and 300*b* and may further include a second robot 400, a third robot 500, visions 610 and 630, and a controller 700.

Referring back to FIGS. 1, 2, 4, and 6, the transfers 110 and 130 may move along transfer shuttles 120 and 140. Each of the transfers 110 and 130 may move along one of the transfer shuttles 120 and 140 and move a position of any one among the panel P1, the bonding target panel P2, and the panel assembly PA. Each of the transfers 110 and 130 may support any one (hereinafter referred to as a "panel P1, P2, or PA") among the panel P1, the bonding target panel P2, and the panel assembly PA. In a state in which each of the transfers 110 and 130 supports any one among the panel P1, the bonding target panel P2, and the panel assembly PA, each of the transfers 110 and 130 may move along one of the transfer shuttles 120 and 140. In this case, a plurality of transfers 110 or 130 may be provided on and supported by one transfer shuttle 120 or 140.

Referring back to FIGS. 1, 2, 4, and 6, the transfer shuttles 120 and 140 may provide movement paths of the transfers 110 and 130. The transfers 110 and 130 on which the panel P1, P2, or PA may be loaded may move along the transfer shuttles 120 and 140. Movement rails may be formed on the transfer shuttles 120 and 140 in the first direction.

The transfer shuttles 120 and 140 may include a first transfer shuttle 120 and a second transfer shuttle 140. The first transfer shuttle 120 and the second transfer shuttle 140 according to one embodiment may be provided in parallel in the second direction and may independently provide the movement path to any one of the panel P1, the bonding target panel P2, and the panel assembly PA which are different from each other in the first direction. Since a plurality of transfer shuttles 120 and 140 are provided, movement paths may be provided for the plurality of panels P1, P2, or PA at the same time in a small space without interfering with each other.

The first transfer shuttle 120 according to one embodiment may be spaced apart from the second transfer shuttle 140 in the second direction and may provide the independent movement path for the panel P1, P2, or PA in the first direction. That is, the first transfer shuttle 120 may provide a first movement path, and the second transfer shuttle 140 may provide a second movement path.

The first transfer shuttle 120 according to one embodiment may be provided parallel to first to fourth bonding chambers 210 to 240 in the first direction.

An end portion of the first transfer shuttle 120 according to one embodiment may be positioned within a movement range of the second robot 400 which will be described below.

The transfers 110 and 130 may include first transfers 110 and second transfers 130. Each of the first transfers 110 and the second transfers 130 may have a cantilever shape.

The first transfer 110 having the cantilever shape may be provided on and supported by the first transfer shuttle 120. A plurality of first transfers 110 may share the movement path.

A detection sensor (not shown) may control movement of the first transfers 110 in order to prevent the first transfer 110 from physically interfering or colliding with the other first transfer 110 on the movement path on the first transfer shuttle 120. That is, while the first transfer 110 moves to a position, when the first transfer 110 is positioned at a position adjacent to the other first transfer 110, the detection sensor (not shown) may stop a movement operation of the first transfer 110 upon recognizing the presence of the other first transfer 110.

The panel P1, P2, or PA may be loaded on the first transfer 110. The first transfer 110 may be provided on the first transfer shuttle 120 so that one side of the first transfer 110 extends and may move along the movement path. An upper surface of the first transfer 110 may have a shape corresponding to the panel P1, P2, or PA.

The first transfer 110 may include a lifting unit. The lifting unit may adjust a support height of the panel P1, P2, or PA by moving the first transfer 110 upward or downward in the third direction. The lifting unit is provided to prevent interference or collision with another structure in the lamination system 1 having a high degree of spatial integration. Accordingly, the panel P1 may be supported while positioned at a specific height between a first height to a second height in the third direction.

Although the movement paths are the same in the first direction, in order to prevent interference between the plurality of panels P1, P2, or PA, a substrate treatment process may be performed at the first height, and a collection process for the panel P1, P2, or PA may be performed at the second height so that a new arbitrary process is performed after the panel is unloaded. The first height to the second height may be determined according to a height of the lifting unit.

The first transfer shuttle 120 may have a length in the first direction, and the length of the entire first transfer shuttle 120 may be the same as the sum of the movement paths of the different first transfers 110.

The length of the first transfer shuttle 120=Σ the movement paths of the different first transfers 110

The second transfer 130 having the cantilever shape may be provided on and supported by the second transfer shuttle 140. A plurality of second transfers 130 may share the movement path.

A detection sensor (not shown) may control movement of the second transfer 130 in order to prevent the second transfer 130 from physically interfering or colliding with the other second transfer 130 on the movement path on the second transfer shuttle 140. That is, while the second transfer 130 moves to a position, when the second transfer 130 is positioned at a position adjacent to the other second transfer 130, the detection sensor (not shown) may stop a movement operation of the second transfer 130 upon recognizing the presence of the other second transfer 130.

The panel P1, P2, or PA may be loaded on the second transfer 130. The second transfer 130 may be provided on the second transfer shuttle 140 so that one side of the second transfer 130 extends and may move along the movement path. An upper surface of the second transfer 130 may have a shape corresponding to the panel P1, P2, or PA.

The second transfer 130 may include a lifting unit. The lifting unit may adjust a support height of the panel P1, P2, or PA by moving the second transfer 130 upward or downward in the third direction. The lifting unit is provided to prevent interference or collision with another structure in the lamination system 1 having a high degree of spatial integration. Accordingly, the panel P1 may be supported while positioned at a specific height between a first height to a second height in the third direction.

Although the movement paths are the same in the first direction, in order to prevent interference between the plurality of panels P1, P2, or PA, a substrate treatment process may be performed at the first height, and a collection process for the panel P1, P2, or PA may be performed at the second height so that a new arbitrary process is performed after the panel is unloaded. The first height to the second height may be determined according to a height of the lifting unit.

The second transfer shuttle 140 may have a length in the first direction, and the length of the entire second transfer shuttle 140 may be the same as the sum of the movement paths of the different second transfers 130.

The length of the second transfer shuttle 140=Σ the movement paths of the different second transfers 130

Referring back to FIGS. 1, 3, 6, and 7, the bonding chambers 210 to 240 may be provided parallel to the transfer shuttles 120 and 140. The bonding chambers 210 to 240 may bond the panel P1 and the bonding target panel P2. In the bonding chambers 210 to 240, the panel P1 and the bonding target panel P2 may be provided to face each other in the third direction, and a position of one or positions of both may be moved to bond the panel P1 and the bonding target panel P2 to form the panel assembly PA.

The plurality of bonding chambers 210 to 240 according to one embodiment may be formed. The plurality of different bonding chambers 210 to 240 may be disposed arbitrary distances apart from each other.

The bonding chambers 210 to 240 may include a first bonding chamber 210, a second bonding chamber 220, a third bonding chamber 230, and a fourth bonding chamber 240. The first bonding chamber 210 may be disposed apart from the second bonding chamber 220 in the first direction. The first bonding chamber 210 may be disposed apart from the third bonding chamber 230 in the second direction. The fourth bonding chamber 240 may be disposed apart from the third bonding chamber 230 in the first direction and spaced apart from the second bonding chamber 220 in the second direction.

Referring back to FIGS. 1 to 4 or 6 and 7, the first robots 300a and 300b may transfer any one of the panel P1, the bonding target panel P2, and the panel assembly PA between the transfers 110 and 130 and any one of the bonding chambers 210 to 240.

Referring to FIGS. 1 and 3, according to one embodiment, the panel P1 and the bonding target panel P2 may be transferred from the transfers 110 and 130 to the bonding chamber 210 or 230 by a first robot 300a. In addition, the panel assembly PA may be transferred from the bonding chamber 210 or 230 to the transfers 110 and 130 by the first robot 300a.

In addition, according to one embodiment, the panel P1 and the bonding target panel P2 may be transferred from transfers 110 and 130 to the bonding chamber 220 or 240 by a first robot 300b. In addition, the panel assembly PA may be transferred from the bonding chamber 220 or 240 to the transfers 110 and 130 by the first robot 300b.

Referring back to FIG. 4, the first robots 300a and 300b according to one embodiment may be provided on a bridge, and the bridge provided above the transfers 110 and 130 in the third direction in order to not interfere with the transfers 110 and 130.

There is a difference in a layout relationship between the first robots 300a and 300b, the visions 610 and 630, and vision shuttles 620 and 640 between the lamination system 1 according to another embodiment of the present invention in FIGS. 6 and 7 and the lamination system 1 according to one embodiment of the present invention in FIGS. 1 to 5. Features of the lamination system 1 according to another embodiment of FIGS. 6 and 7 will be described, but content overlapping that of FIGS. 1 to 5 will be omitted.

Referring to FIGS. 6 and 7, according to another embodiment, each of the panel P1 and the bonding target panel P2 may be transferred from the transfer 110 or 130 to the bonding chamber 210 or 220 by the first robot 300a. In addition, the panel assembly PA may be transferred from the bonding chamber 210 or 220 to the transfer 110 or 130 by the first robot 300a.

In addition, according to another embodiment, each of the panel P1 and the bonding target panel P2 may be transferred from the transfer 110 or 130 to the bonding chamber 230 or 240 by the first robot 300b. In addition, the panel assembly PA may be transferred from the bonding chamber 230 or 240 to the transfer 110 or 130 by the first robot 300b.

Each of the first robots 300a and 300b may move a position of at least one panel P1, P2, or PA to one of different process regions in the manufacturing process of the display apparatus. Each of the first robots 300a and 300b may have the movement range in which each of the first robots 300a and 300b may be connected to at least two of the bonding chambers 210 to 240.

Referring FIGS. 1 and 3, the first robot 300a according to one embodiment may be connected to the first bonding chamber 210 and the third bonding chamber 230. That is, the first robot 300a may be connected to at least one among the first bonding chamber 210, the third bonding chamber 230, the first transfer 110, and the second transfer 130.

In addition, according to one embodiment, the first robot 300b may be connected to the second bonding chamber 220 and the fourth bonding chamber 240. That is, the first robot 300b may be connected to at least one among the second bonding chamber 220, the fourth bonding chamber 240, the first transfer 110, and the second transfer 130.

Referring to FIGS. 6 and 7, the first robot 300a according to another embodiment may be connected to the first bonding chamber 210 and the second bonding chamber 220. That is, the first robot 300a may be connected to at least one among the first bonding chamber 210, the second bonding chamber 220, the first transfer 110, and the second transfer 130.

In addition, according to another embodiment, the first robot 300b may be connected to the third bonding chamber 230 and the fourth bonding chamber 240. That is, the first robot 300b may be connected to at least one among the third bonding chamber 230, the fourth bonding chamber 240, the first transfer 110, and the second transfer 130.

Referring back to FIGS. 1 to 4 or FIGS. 6 and 7, the second robot 400 may move a position of the bonding target panel P2 to different process regions in the manufacturing process of the display apparatus. The second robot 400 may have a movement range in which the second robot 400 may be connected to a loading portion 20 and the transfer 110 or 130. The second robot 400 according to one embodiment may be connected to at least one among a loading portion 20, the first transfer 110, and the second transfer 130.

Referring back to FIGS. 1 to 4 or FIGS. 6 and 7, the third robot 500 may move a position of the panel assembly PA to a different process region in the manufacturing process of the display apparatus. The third robot 500 may have a movement range in which the third robot 500 may be connected to an unloading portion 30 and the transfer 110 or 130. The third robot 500 according to one embodiment may be connected to at least one of an unloading portion 30, the first transfer 110, and the second transfer 130.

Referring back to FIGS. 1 to 4 or FIGS. 6 and 7, a fourth robot may remove a protective film from a bonding target panel in each of different process regions in the manufacturing process of the display apparatus. The fourth robot may have a movement range in which the fourth robot may be connected to a protective film collection portion, a tape providing portion, and the transfer. The fourth robot according to one embodiment may be connected to at least one of the protective film collection portion, the tape providing portion, the first transfer 110, and the second transfer 130.

The protective film collection portion may be a region in which a protective film collection box is positioned, wherein protective films attached for protecting surfaces of the bonding target panel are removed and collected in the protective film collection box to be discarded.

The tape providing portion may be a region in which a supply box is positioned, wherein a tape having a sufficient adhesive force to delaminate the protective film on the bonding target panel is supplied from the box.

Referring back to FIGS. 1, 3, 6, and 7, the visions 610 and 630 may check positions of the panel P1 and the bonding target panel P2 positioned in the bonding chambers 210 to 240. The vision 610 or 630 may move along the vision shuttle 620 or 640. The vision 610 or 630 may be connected to at least two bonding chambers of the bonding chambers 210 to 240 while moving along the vision shuttle 620 or 640. In this case, the vision shuttle 620 or 640 may support the vision 610 or 630 and provide a movement path of the vision 610 or 630.

The vision 610 and 630 may include a first vision 610 and a second vision 630.

Referring to FIGS. 1 and 3, the vision shuttle 620 or 640 according to one embodiment may be provided parallel to the transfer shuttle 120 or 140. The first vision 610 may be provided parallel and adjacent to the first transfer shuttle 120. That is, a position of the first vision 610 may be moved along the first vision shuttle 620 in the first direction. The first vision 610 may access the first bonding chamber 210 or the second bonding chamber 220.

The second vision 630 according to one embodiment may be disposed parallel and adjacent to the second transfer shuttle 140. That is, a position of the second vision 630 may be moved along the second vision shuttle 640 in the first direction. The second vision 630 may access the third bonding chamber 230 or the fourth bonding chamber 240.

Referring to FIGS. 6 and 7, the vision 610 or 630 according to another embodiment may be provided to intersect with the transfer shuttle 120 or 140. The first vision 610 may be provided perpendicular and adjacent to and to intersect with the first transfer shuttle 120. That is, a position of the first vision 610 may be moved along the first vision shuttle 620 in the second direction. The first vision 610 may access the first bonding chamber 210 or the third bonding chamber 230.

Referring back to FIG. 5, the vision 610 or 630 according to another embodiment is provided on and supported by a bridge, and the bridge may be provided above the transfers 110 and 130 in order to not interfere with the transfers 110 and 130 in the third direction.

The second vision 630 may be provided perpendicular and adjacent to and to intersect with the second transfer shuttle 140. That is, a position of the second vision 630 may be moved along the second vision shuttle 640 in the second direction. The second vision 630 may access the second bonding chamber 220 or the fourth bonding chamber 240.

The vision shuttle 620 or 640 may provide a movement path of the vision 610 or 630. A moving rail formed in the first direction or the second direction may be formed on the vision shuttle 620 or 640.

A plurality of vision shuttles 620 and 640 may be formed as a pair. The vision shuttle 620 and 640 may include the first vision shuttle 620 and the second vision shuttle 640.

Referring to FIGS. 1 and 3, the vision shuttles 620 and 640 according to one embodiment may be spaced apart from each other and may provide movement paths in the first direction. Since the plurality of vision shuttles 620 and 640 are provided, a vision does not need to be provided for each of the bonding chambers 210 and 220, or 230 and 240, and the movement path may be provided for the vision 610 or 630 without interference in a small space.

The first vision shuttle 620 according to one embodiment may be provided parallel to the first bonding chamber 210 or the second bonding chamber 220 in the first direction.

The second vision shuttle 640 according to one embodiment may be provided parallel to the third bonding chamber 230 or the fourth bonding chamber 240 in the first direction.

Referring to FIGS. 6 and 7, the vision shuttles 620 and 640 according to another embodiment may be spaced apart from each other and may provide movement paths in the second direction. Since the plurality of vision shuttles 620 and 640 are provided, a vision does not need to be provided for bonding chambers 210 and 230, or 220 and 240, and a movement path may be provided for the vision 610 or 630 without interference in a small space.

The first vision shuttle 620 according to one embodiment may be provided parallel to the first bonding chamber 210 or the third bonding chamber 230 in the second direction.

The second vision shuttle 640 according to one embodiment may be provided parallel to the second bonding chamber 220 or the fourth bonding chamber 240 in the second direction.

Referring back to FIGS. 1 and 6, the controller 700 may control the transfer 110 or 130, the bonding chambers 210 to 240, and the first robot 300a or 300b to be driven. The controller 700 may include the robot arm counter 710 and a loading counter and may further include the bonding counter.

The robot arm counter 710 may adjust the first robot 300a or 300b to provide the panel assembly PA to the transfer 110 or 130 in each robot arm cycle. The robot arm cycle is a movement operation time in units of panel assemblies PA when a plurality of different panel assemblies PA of which bonding processes are completed are unloaded from the lamination system 1.

In the table of FIG. 5, each column indicates a cycle time. For example, a bonding process in the first bonding chamber 210 takes four cycles.

The left column indicates processes of the bonding chambers 210 to 240, and the right column indicates operation relationships of the first robots 300a and 300b.

In this case, an arrow ↑ indicates that the panel P1 and the bonding target panel P2 are loaded into any one of the bonding chambers 210 to 240, and an arrow ↓ indicates that the panel assembly PA is unloaded from any one of the bonding chambers 210 to 240.

That is, the first robot 300a may load the panel P1 into the first bonding chamber 210 in a first cycle time, the bonding process may be performed in the first bonding chamber 210 from second to fifth cycle times, and the first robot 300b may unload the panel assembly PA from the first bonding chamber 210 in a sixth cycle time and load the panel assembly PA on the transfer 110 or 130.

The controller 700 may sequentially control bonding processes in the first bonding chamber 210 to fourth bonding chamber 240 through a loading cycle, the robot arm cycle, and a bonding cycle.

Referring to the table in FIG. 5, the robot arm counter 710 may adjust the first robot 300a to receive the panel assembly PA from the first bonding chamber 210 in each fourth and eighth cycle times. The robot arm counter 710 may adjust the first robot 300b to receive the panel assembly PA from the third bonding chamber 230 in each of sixth and tenth cycle times.

The robot arm counter 710 may control the first robot 300b to receive the panel assembly PA from the second bonding chamber 220 in each of fifth and ninth cycle times. The robot arm counter 710 may control the first robot 300b to receive the panel assembly PA from the fourth bonding chamber 240 in seventh and eleventh cycle times.

The loading counter 720 may adjust the transfer 110 or 130 to receive the bonding target panel P2 in each loading cycle. The loading cycle is a movement operation time in units of the bonding target panels P2 when the bonding target panel P2 on which the bonding process is performed is loaded on the lamination system 1.

According to one embodiment, the loading cycle may be correlated with the robot arm cycle by a factor of n. In this case, n may be an integer and a natural number.

Referring to FIG. 5, each cycle time is the loading cycle of the bonding target panel P2. In this case, since the first robot 300a operates in a robot arm cycle for the first and third cycle times, the loading cycle may be correlated with the robot arm cycle by a factor of 2.

The bonding counter 730 may adjust the bonding chambers 210 to 240 to bond the panel assembly PA to be bonded in each bonding cycle. The bonding cycle is a unit bonding operation time in which the bonding process between the panel P1 and the bonding target panel P2 is performed in any one of the bonding chambers 210 to 240.

According to one embodiment, the robot arm cycle may be correlated with the bonding cycle by a factor of n. In this case, n may be an integer and a natural number.

Referring to FIG. 5, the bonding cycle of the bonding target panel P2 may be four cycle times between the first to fifth cycle times. In this case, since the first robot 300a operates in the robot arm cycle for the first and third cycle times, the robot arm cycle may be correlated with the bonding cycle by a factor of 2.

Hereinafter, the lamination system 1 according to one embodiment of the present invention will be described based on an arrangement region.

Referring back to FIG. 2, the lamination system 1 may include a laminating portion 10, the loading portion 20, the unloading portion 30, the transfer 110 or 130, the first robot 300a or 300b, the second robot 400, and the third robot 500.

Based on a region, the lamination system 1 may include the laminating portion 10, the loading portion 20, and the unloading portion 30.

In the laminating portion 10, the different bonding chambers 210 to 240 may be provided apart from each other. In the laminating portion 10, the plurality of bonding chambers may be disposed apart from each other in the first direction and in the second direction. In addition, the laminating portion 10 may be provided parallel to the loading portion 20 and the unloading portion 30 in the first direction.

In the laminating portion 10, the plurality of bonding chambers 210 to 240 are disposed spatially apart from each other in the second direction, and in this case, may be disposed spatially efficiently.

In the loading portion 20 according to one embodiment, a loader which loads the bonding target panel P2 may be provided. In this case, the loading portion 20 may be provided independently of a region into which the panel P1 is loaded. The loading portion 20 may be provided parallel to the unloading portion 30 in the second direction.

In the unloading portion 30, an unloader which unloads the panel assembly PA may be provided.

Since the transfer 110 or 130, the first robot 300a or 300b, the second robot 400, and the third robot 500 have all features described above, description thereof will be omitted.

According to embodiments of the present invention, since a transfer and a first robot are provided so that sequential bonding processes can be independently performed in different bonding chambers, there are advantages in that the bonding process time for each panel assembly can be reduced and a process yield can be improved.

According to one embodiment of the present invention, since a plurality of bonding chambers are provided, a plurality of transfers move along a transfer shuttle, and a first robot having a free movement range allows a panel to move between the transfer and the bonding chamber, there is an advantage of occupying a small process site and increasing the number of manufactured products per area.

According to another embodiment of the present invention, since a first robot arm is provided above a transfer and a transfer shuttle in a third direction, there is an advantage of improving spatial utilization.

According to still another embodiment of the present invention, since a vision and a vision shuttle are provided above a transfer and a transfer shuttle in a third direction, there is an advantage of improving spatial utilization.

According to yet another embodiment of the present invention, since a laminating portion, a loading portion, and an unloading portion are disposed in different regions but disposed adjacent to each other so that a panel can be sequentially moved using a transfer and first to third robots, there is an advantage of improving the sequential mass production performance of a panel assembly.

According to yet another embodiment of the present invention, since a laminating portion has a specific length in a first direction, a loading portion and an unloading portion are provided in a second direction and a transfer and first to third robots, which improves position mobility of a panel, are provided in order to solve a length limitation of the laminating portion in the first direction, and therefore, there is an advantage of improving a degree of spatial integration.

Although the present invention has been described above in detail through the exemplary embodiments, the scope of the present invention is not limited to the detailed description but should be interpreted based on the appended claims. In addition, those skilled in the art will understand that many modifications and variations are possible without departing from the scope of the present invention.

What is claimed is:

1. A lamination system which bonds a panel and a bonding target panel with an adhesive interposed between the panel and the bonding target panel to form a panel assembly, the lamination system comprising:
   a transfer shuttle which has a first transfer shuttle and a second transfer shuttle spaced apart from each other in a second direction orthogonal to a first direction to provide different movement paths in the first direction;
   a transfer which has a first transfer movable along the first transfer shuttle and a second transfer movable along the second transfer shuttle, and supports any one among the panel, the bonding target panel, and the panel assembly;
   a bonding chamber which is provided parallel to the transfer shuttle and bonds the panel and the bonding target panel with the adhesive; and
   a first robot which transfers any one among the panel, the bonding target panel, and the panel assembly between the transfer and the bonding chamber,
   wherein
   the first transfer and the second transfer respectively include a first lifting unit and a second lifting unit, each of the first lifting unit and the second lifting unit movable on an arbitrary height in a third direction orthogonal to the first direction and the second direction,
   the first transfer supports at least one of the panel and the bonding target panel, and the second transfer supports the panel assembly,
   a first height and a second height are determined according to a height of the lifting unit, and a substrate treatment process is performed at the first height, and a collection process is performed at the second height in order to prevent interference among the panel, the bonding target panel, and the panel assembly.

2. The lamination system of claim 1, wherein the bonding chamber is disposed as a plurality of bonding chambers with the transfer shuttle interposed therebetween.

3. The lamination system of claim 2, wherein the first robot has a movement range in which the first robot is connected to at least two of the bonding chambers.

4. The lamination system of claim 1, comprising:
a second robot which transfers the bonding target panel to the transfer; and
a third robot which transfers the panel assembly from the transfer,
wherein the transfer shuttle is provided parallel to the bonding chamber in a first direction, and
an end portion of the transfer shuttle is positioned within a movement range of the second robot.

5. The lamination system of claim 1, further comprising:
a vision shuttle which has a first vision shuttle and a second vision shuttle spaced apart from each other in the second direction to provide different movement paths in the first direction, and is provided parallel to the transfer shuttle; and
a vision which has a first vision movable along the first vision shuttle and a second vision movable along the second vision shuttle, and accesses at least two of the bonding chambers, and checks a position of the panel or the bonding target panel loaded in the bonding chamber.

6. The lamination system of claim 5, wherein the vision shuttle is provided parallel or to intersect with the transfer shuttle.

7. The lamination system of claim 1, further comprising a controller which controls the transfer, the bonding chamber, and the first robot to be driven,
wherein:
the controller includes a robot arm counter which adjusts the panel assembly to be received from the first robot in each robot arm cycle and a loading counter which adjusts the bonding target panel to be provided to the transfer in each loading cycle; and
the loading cycle is correlated with the robot arm cycle by a factor of n (n is an integer and n>0).

8. The lamination system of claim 7, wherein:
the controller further includes a bonding counter which adjusts the bonding chamber to bond the panel assembly in each bonding cycle; and
the robot arm cycle is correlated with the bonding cycle by a factor of n (n is an integer and n>0).

9. A lamination system comprising:
a laminating portion in which different bonding chambers are provided apart from each other;
a loading portion into which a panel is loaded;
an unloading portion from which a panel assembly, in which a bonding target panel is bonded to the panel, is unloaded;
a transfer shuttle which has a first transfer shuttle and a second transfer shuttle spaced apart from each other in a second direction orthogonal to a first direction to provide different movement paths in the first direction;
a transfer which has a first transfer movable along the first transfer shuttle and a second transfer movable along the second transfer shuttle, and supports any one among the panel, the bonding target panel, and the panel assembly
a first robot which moves a position of at least any one among the panel, the bonding target panel, and the panel assembly between the bonding chamber and the transfer;
a second robot which moves a position of the bonding target panel between the loading portion and the transfer; and
a third robot which moves a position of the panel assembly between the unloading portion and the transfer,
wherein
the bonding chambers bonds the panel and the bonding target panel with an adhesive interposed between the panel and the bonding target panel,
the first transfer and the second transfer respectively include a first lifting unit and a second lifting unit, each of the first lifting unit and the second lifting unit movable on an arbitrary height in a third direction orthogonal to the first direction and the second direction,
the transfer shuttle is located between the loading portion, the unloading portion, and the laminating portion,
the first transfer supports at least one of the panel and the bonding target panel, and the second transfer supports the panel assembly,
a first height and a second height are determined according to a height of the lifting unit, and
a substrate treatment process is performed at the first height, and a collection process is performed at the second height in order to prevent interference among the panel, the bonding target panel, and the panel assembly.

10. The lamination system of claim 9, wherein:
the laminating portion is provided parallel to the loading portion and the unloading portion in a first direction; and
the loading portion is provided parallel to the unloading portion in a second direction perpendicular to the first direction.

* * * * *